United States Patent [19]

Ramsey

[11] Patent Number: 5,437,301

[45] Date of Patent: Aug. 1, 1995

[54] INFLATION AND DEFLATION VALVE ESPECIALLY ADAPTED FOR USE WITH DUNNAGE AIR BAGS

[75] Inventor: J. W. Ramsey, Benton, Ark.

[73] Assignee: Sunrise Arkansas, Inc., Benton, Ark.

[21] Appl. No.: 108,422

[22] Filed: Aug. 19, 1993

[51] Int. Cl.$^6$ .................. F16K 15/20; B61D 45/00
[52] U.S. Cl. .................. 137/231; 137/605; 137/888; 410/119; 410/125
[58] Field of Search ............. 137/223, 231, 605, 861, 137/887, 888; 251/148; 410/119, 124, 125

[56] References Cited

U.S. PATENT DOCUMENTS

| | | | |
|---|---|---|---|
| 1,584,934 | 5/1926 | Harris | 137/231 X |
| 2,716,998 | 9/1955 | Knasko | 137/231 |
| 2,939,478 | 6/1960 | Dockrell | 137/223 |
| 2,960,942 | 11/1960 | Pier et al. | 410/119 |
| 3,098,455 | 7/1963 | McElroy et al. | 410/125 |
| 3,131,648 | 5/1964 | Seger | 410/119 |
| 3,160,118 | 12/1964 | Newell | 410/119 |
| 3,450,147 | 6/1969 | Webb | 137/226 |
| 3,476,138 | 11/1969 | Doremus et al. | 137/323 |
| 3,566,910 | 3/1971 | Doremus et al. | 137/323 |
| 3,753,414 | 8/1973 | Enochian | 410/119 |
| 3,807,432 | 4/1974 | Cain | 137/224 |
| 3,915,096 | 10/1975 | Salisbury | 410/125 |
| 4,073,389 | 2/1978 | Angarola et al. | 137/223 X |
| 4,146,069 | 3/1979 | Angarola et al. | 137/223 X |
| 4,915,124 | 4/1990 | Sember, III | 137/223 |
| 5,056,558 | 10/1991 | Rodgers | 410/125 X |
| 5,082,244 | 1/1992 | Krier et al. | 410/125 X |
| 5,111,838 | 5/1992 | Langston | 137/223 |
| 5,159,961 | 11/1992 | Snetting et al. | 137/223 X |
| 5,203,831 | 4/1993 | Lind et al. | 137/223 X |
| 5,275,197 | 1/1994 | Finell | 137/223 X |

Primary Examiner—John Rivell
Attorney, Agent, or Firm—Boyd D. Cox

[57] ABSTRACT

An inflation and deflation device especially adapted for use with dunnage air bags includes a cylindrical valve body possessing a first end mounted for relative rotation within a hollow interior cylindrical portion of a valve actuator. An internal spring biases a valve seat radially outwardly into engagement with an internal cylindrical side wall portion of the valve actuator. Rotation of the valve actuator selectively aligns air exhaust passages of the valve seat and the valve actuator to deflate an associated dunnage air bag. The valve body includes air passages connecting a compressed air source to the dunnage bag for selective inflation and to allow use of the compressed air source to provide a relatively high velocity air stream across an air passage connected to the dunnage bag to facilitate deflation of the bag by inducing a vacuum. One end portion of the valve body opposite the valve actuator includes an axially slidable coupling sleeve for selective engagement with a quick release valve of a dunnage air bag. A plurality of the inflation and deflation valves may be used in a manifold system to allow selective independent inflation and deflation of a plurality of dunnage air bags.

14 Claims, 3 Drawing Sheets

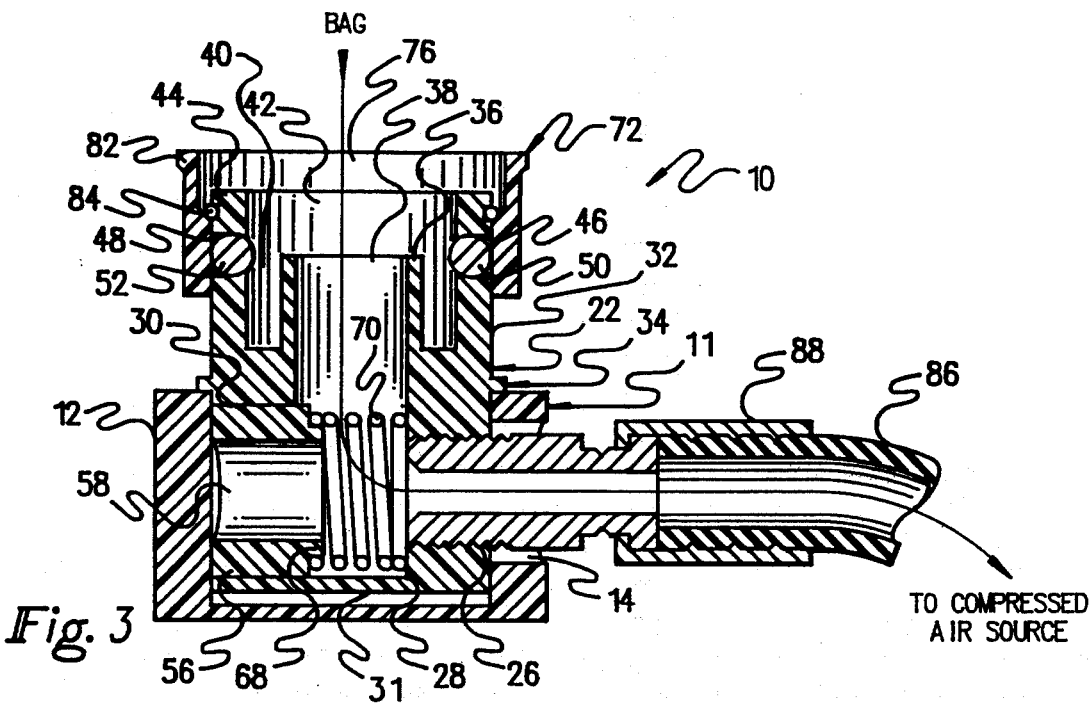
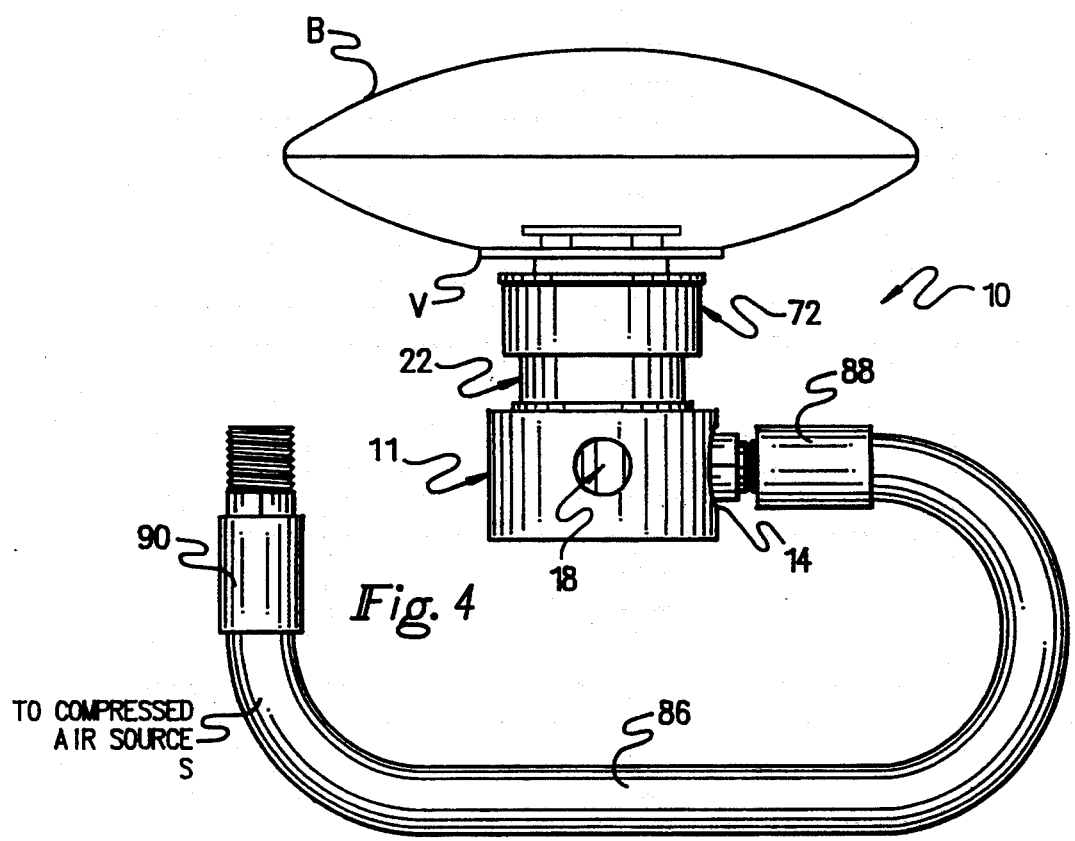

: 1

INFLATION AND DEFLATION VALVE ESPECIALLY ADAPTED FOR USE WITH DUNNAGE AIR BAGS

CROSS-REFERENCE TO RELATED APPLICATIONS

This application contains subject matter related to that of U.S. Patent utility patent application Ser. No. 07/877,713, filed May 4, 1992, the entire disclosure of which is incorporated herein by reference.

BACKGROUND OF THE INVENTION

Dunnage air bags are widely used when transporting freight and cargo in containers, trailers, and train cars. Such bags are typically formed with a disposable construction and include conventional valve stem couplings adapted for connection to a conventional compressed air source supply hose. In use, the dunnage air bags are positioned around and adjacent to cargo and freight items, typically between individual freight items and between freight items and the walls of the corresponding container, train car, or trailer. The dunnage air bags are then inflated to cushion and protect the freight items from damage during transportation. After use or if a need to reposition arises, the dunnage air bags are typically pierced or ripped for purposes of rapid deflation, rendering them subsequently unusable. The used dunnage bags are then disposed as waste materials. In addition to time consuming and tedious inflation and deflation, wasteful one time use and subsequent disposable, conventional dunnage air bags require individual inflation and deflation. Accordingly, there is a need for and considerable interest in a dunnage air bag inflation and deflation device which allows reuse, repositioning, rapid inflation and deflation, and selective individual inflation and deflation of a plurality of dunnage bags through a manifold system.

SUMMARY OF THE INVENTION

In order to achieve these and other objects of the invention, the present invention provides an improved inflation and deflation valve especially adapted for use with dunnage air bags which includes a cylindrical valve body possessing a first end mounted for relative rotation within a hollow interior cylindrical portion of a valve actuator. An internal spring biases a valve seat radially outwardly into engagement with an internal cylindrical side wall portion of the valve actuator. Rotation of the valve actuator selectively aligns air exhaust passages of the valve seat and the valve actuator to deflate an associated dunnage air bag. The valve body includes air passages connecting a compressed air source to the dunnage bag for selective inflation and to allow use of the compressed air source to provide a relatively high velocity air stream across an air passage connected to the dunnage bag to facilitate deflation of the bag by inducing a vacuum. One end portion of the valve body opposite the valve actuator includes an axially slidable coupling sleeve for selective engagement with a quick release fitting of a dunnage bag. A plurality of the inflation and deflation valves may be used in a manifold system to allow selective independent inflation and deflation of a plurality of dunnage air bags.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 3 is a longitudinal cross-sectional view similar to FIG. 2, but illustrating the inflation and deflation valve in a closed position.

FIG. 4 is a side elevational view illustrating the manner of connecting the inflation and deflation valve of the present invention to a source of compressed air and to a dunnage air bag.

DETAILED DESCRIPTION OF THE PREFERRED EMBODIMENT(S)

Figure 5:
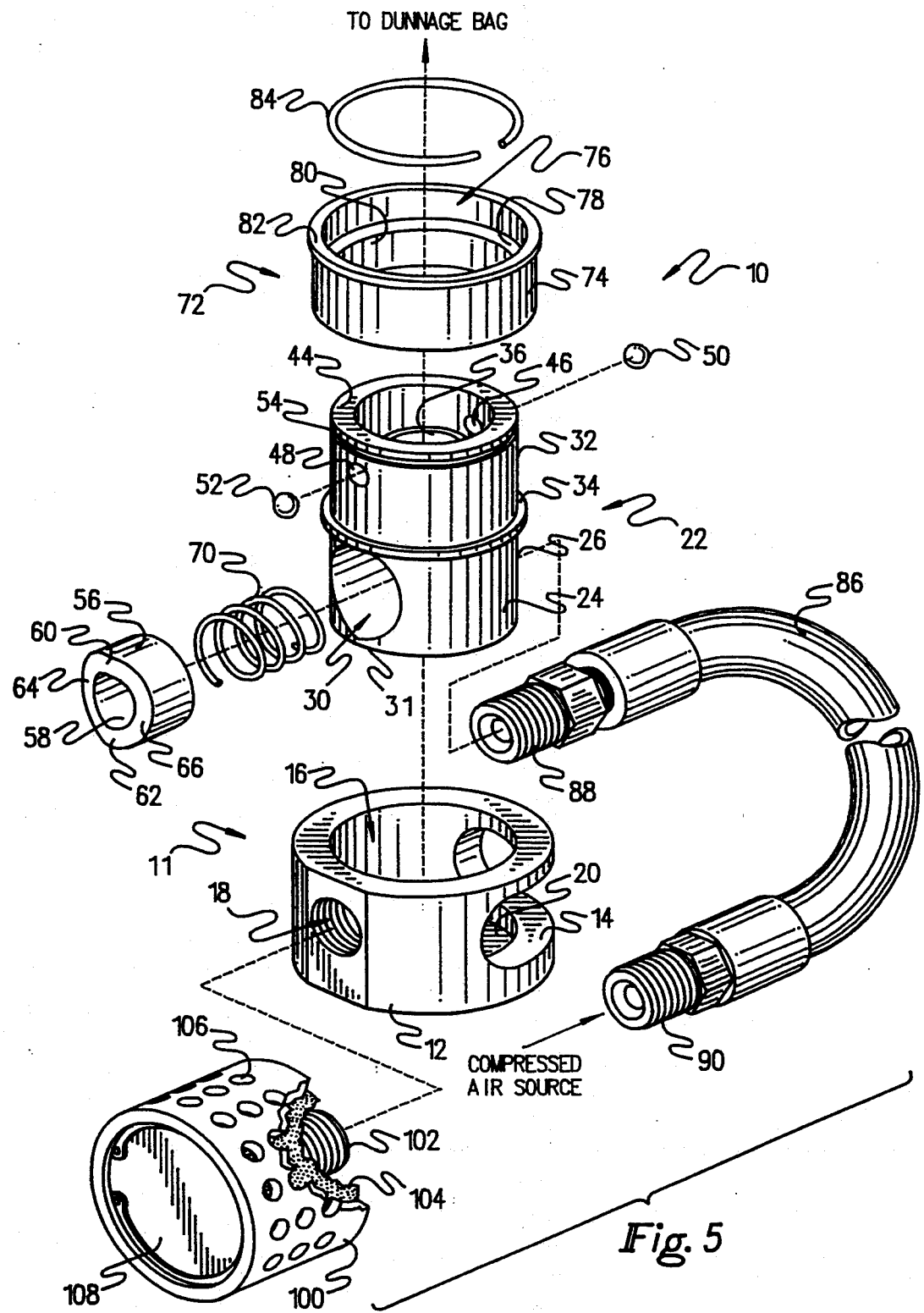
FIG. 5 is an exploded perspective view illustrating the components of the inflation and deflation valve of the present invention.

Referring now to the drawings, wherein like reference numerals designate corresponding structure throughout the views, and referring in particular to FIGS. 1 through 5, an inflation and deflation valve for use with a dunnage air bag pursuant to a preferred embodiment of the present invention includes a substantially cylindrical valve actuator 11 comprising a cylindrical disk-shaped body 12 possessing a substantially cylindrical hollow interior portion 16 communicating with a circumferentially extending slot 14. The hollow interior portion 16 opens upwardly through a circular aperture in a top end face of the valve actuator 11. A cylindrical exhaust passage 18 is formed transversely through a side wall portion of the valve actuator 11 in a position diametrically opposite a medial portion of the slot 14. As shown in FIG. 5, a cylindrical muffler 100 includes a threaded stem 102 for engagement with exhaust passage 18 such that exhaust air passes through a dampening material such as open cell foam 104 prior to exhaust to ambient through vents 106. A circular end panel 108 of muffler 100 is secured in place by a snap-ring. A circular floor 20 closes a bottom end face of the valve actuator 11.

A substantially cylindrical valve body 22 includes a first end portion 24 and a second opposite end portion 32 divided by a substantially medial circumferentially extending radially outwardly enlarged rib 34. A substantially radially extending threaded air supply bore 26 is disposed substantially diametrically opposite a radially extending air exhaust passage 30 in end portion 24 of valve body 22. An annular planar circular spring seat 28 in end portion 24 surrounds an inner end of the air supply bore 26. A substantially cylindrical valve seat 56 received for reciprocal sliding movement in the air exhaust passage 30 possesses an inner reduced diameter neck portion 68 forming an annular shoulder. A coil compression spring 70 possesses a first end disposed in abutment with the spring seat 28 and a second opposite end surrounding the neck portion 68 and abutting the annular shoulder on the inner end face of the valve seat 56. Thus, the spring 70 biases the valve seat 56 radially outwardly within air exhaust passage 30.

With reference to FIG. 5, a radially outer end face of the valve seat 56 possesses a cylindrical curvature about an axis substantially perpendicular to a longitudinal central axis of the valve seat 56 extending centrally through a cylindrical air exhaust aperture 58. The end face of the valve seat 56 is thus not planar, but rather cylindrically curved, and possesses outer portions at 60 and 62 and inner portions at 64 and 66. The first end portion 24 of the valve body 22 terminates in a closed end face or floor 31. The first cylindrical end portion 24 of the valve body 22 is received for relative rotation in close conformance within the hollow body portion 16 of the valve actuator 11 such that the interior substantially cylindrical portion of the valve actuator 11 restrains the valve seat 56 from movement radially outwardly from the air exhaust passage 30. The outer end face of the valve seat 56 and the interior side wall portion of the valve actuator 11 possess substantially corresponding cylindrical curvatures such that the end face of valve seat 56 forms a substantially airtight seal against the interior side wall portion. Accordingly, the valve actuator 11 and the valve body 22 are mounted for relative rotation such that the valve seat 56 and air exhaust passage 58 thereof are mounted for selective movement into and out of alignment with the air exhaust passage 18 of the valve actuator 11.

The medial circumferentially extending radially enlarged rib 34 of the valve body 22 abuts a circular end face of the valve actuator 11, defining the relative assembled orientation of the components. In the assembled configuration, an air hose 86 includes a first end 90 adapted for connection with a conventional source of compressed air such as a compressor or pressurized tank. A suitable threaded coupling is provided for this purpose. A similar coupling 88 on an opposite end of hose 86 extends through circumferential slot 14 in valve actuator 11 and into threaded engagement with the air supply bore 26 of the valve body 22.

Figure 1:
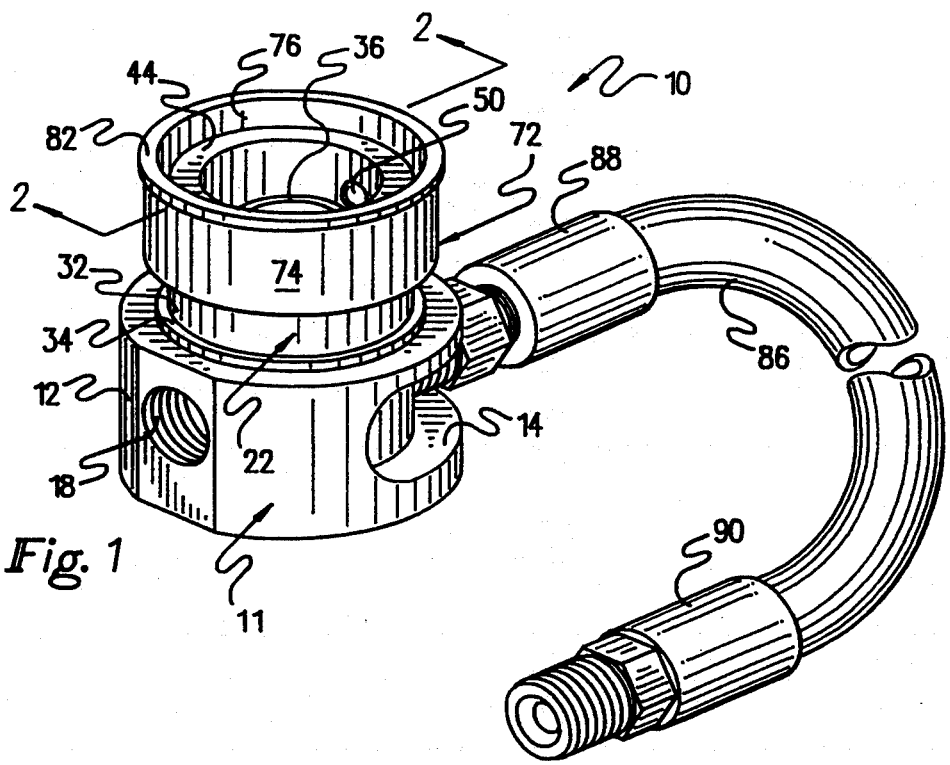
FIG. 1 is a perspective view illustrating the inflation and deflation valve especially adapted for use with dunnage air bags according to the present invention.
Figure 2:
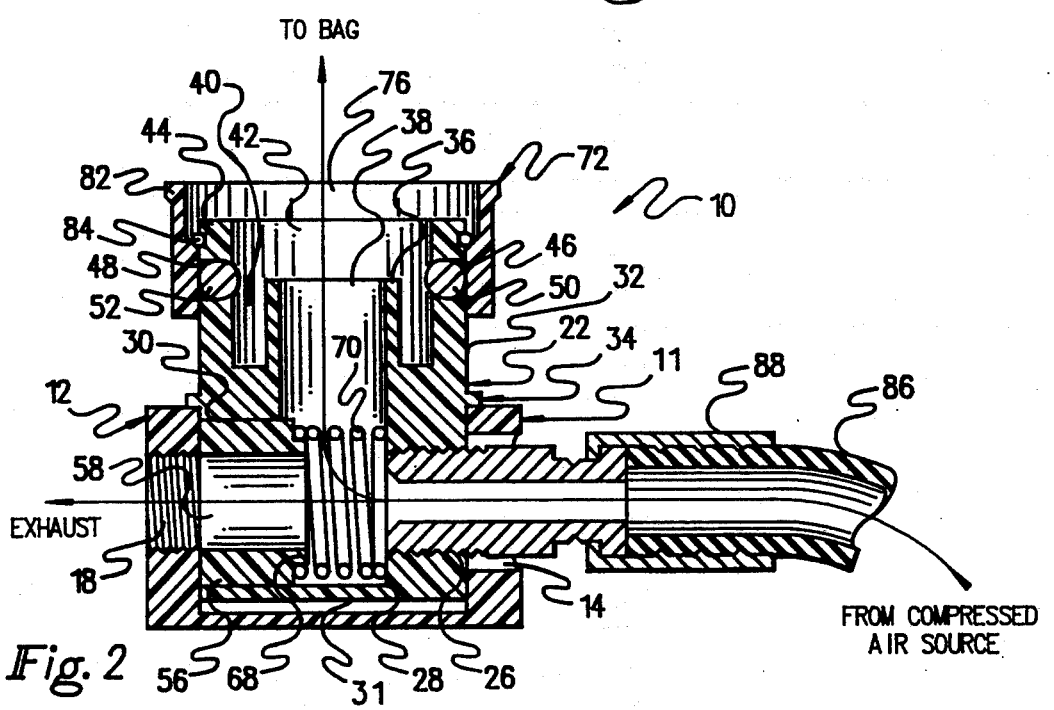
FIG. 2 is a longitudinal cross-sectional view taken along line 2—2 of FIG. 1, depicting the inflation and deflation valve in an open position for deflating a dunnage air bag.

As best shown in FIGS. 2 and 3, the second end portion 32 of the valve body 22 possesses a longitudinally extending enlarged diameter cylindrical hole 42 disposed in coaxial alignment with a reduced diameter longitudinally extending cylindrical conduit 36 formed therein. The conduit 36 extends in fluid communication with the air exhaust aperture 58 in the valve seat 56 and also with the air supply bore 26. A pair of spherical coupling balls 50 and 52 are received for radial movement in diametrically opposed transverse respective apertures 46 and 48 in the second end portion 32 of the valve body 22. A circumferential groove 54 disposed around an outer end portion of the second end portion 32 of the valve body 22 is adapted for engagement with a conventional C-ring or so-called snap ring 84. A coupling sleeve 72 disposed for limited reciprocal axial sliding movement around the second end portion 32 of the valve body 22 includes a stepped diameter hollow cylindrical interior portion including a smaller diameter portion 80 dimensioned for close conformance with the second end portion 32 of the valve body 22, and a larger diameter portion 76 dimensioned to allow coupling balls 50 and 52 to move partially radially outwardly from the opposite respective transverse apertures 46 and 48. After coupling sleeve 72 is disposed in assembled orientation with respect to valve body 22, C-ring 84 is engaged with circumferential groove 54 to prevent displacement of sleeve 72 from second end portion 32 of the valve body 22. A conventional quick release coupling valve V on a dunnage air bag B (FIG. 4) may thus be readily connected in fluid communication with the cylindrical bore 38 of conduit 36 by manipulation of coupling sleeve 72. Specifically, the end portion of the conventional quick release coupling surrounds conduit 36 and is received within annular space 40. At this juncture, coupling sleeve 72 is moved axially upwardly to the position illustrated in FIGS. 2 and 3, thus forcing coupling balls 50 and 52 radially inwardly into engagement with a circumferential groove of the conventional quick release coupling. One example conventional quick release coupling valve suitable for use with dunnage air bags is disclosed in U.S. Pat. No. 5,082,244 issued Jan. 21, 1992, the entire disclosure of which is incorporated by reference herein. To release engagement of the conventional quick release coupling, sleeve 72 is moved axially downwardly, such that an inner end face of sleeve 72 abuts rib 34. In this orientation, coupling balls 50 and 52 will move outwardly into enlarged diameter portion 76, thus allowing disconnection.

With reference now to FIGS. 2, 3 and 4, in use, hose 86 couples threaded bore 26 in valve body 22 to a compressed air source S. When the valve actuator 11 is disposed in the closed orientation illustrated in FIGS. 3 and 4, compressed air is free to flow from a compressed air source S, through hose 86 and coupling 88, through passage 38 in conduit 36, and subsequently outwardly through coupling 72 into quick release valve V, for the purpose of inflating the bag B. When the bag B has reached the desired inflation pressure, a valve (not shown) connecting compressed air source S to the compressor or other air source is closed. When deflation of bag B is desired, valve actuator 11 is manually rotated to dispose exhaust aperture 18 therein into coaxial alignment with the air exhaust passage 58 formed through valve seat 56, as illustrated in FIG. 2. In this condition, air from the bag B flows outwardly through valve V, coupling 72, through passage 38, and outwardly through aligned passages 58 and 18 in valve seat 56 and valve actuator 11, respectively. If desired, bag deflation can be expedited by induced vacuum aspiration by supplying compressed air through coupling 88 and passages 58 and 18, in a direction transverse to air passage 38. Pursuant to known principles of fluid mechanics, this transverse relatively high velocity air flow will create a low pressure in the air passage 38, thus tending to suck air from the dunnage bag.

It is also contemplated that a plurality of dunnage bags B may be simultaneously controlled from a common central compressed air source by a suitable manifold system. In such a multiple bag system, each of the bags B will be connected to the manifold by an inflation and deflation valve assembly 10 according to the present invention. With such a manifold arrangement, any one of a plurality of different dunnage bags may be independently inflated or deflated by appropriate manipulation of the corresponding valve actuator 11.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An inflation and deflation valve for use with a dunnage air bag, comprising:
 a valve actuator including a substantially hollow cylindrical body portion possessing a substantially cylindrical hollow interior portion opening upwardly through a substantially circular aperture in a top end face;
 a circumferentially extending slot in a sidewall portion of said valve actuator;
 a cylindrical exhaust passage formed through a side wall portion of said valve actuator disposed substantially diametrically opposite a medial portion of said slot;
 a substantially cylindrical valve body possessing first and second opposite substantially cylindrical end portions divided by a substantially medial circumferentially extending radially outwardly enlarged rib;
 said first end portion of said valve body including a substantially cylindrical radially extending threaded air supply bore and a substantially diametrically opposite radially extending air exhaust passage;
 an annular planar circular spring seat in said first end portion of said valve body surrounding an inner end of said air supply bore;
 a substantially cylindrical valve seat received for reciprocal sliding movement in said air exhaust passage, said valve seat possessing an inner reduced diameter neck portion forming an annular shoulder;
 a coil compression spring possessing a first end disposed in abutment with said spring seat and a second opposite end surrounding said neck portion and abutting said annular shoulder, said spring biasing said valve seat radially outwardly;
 a radially outer end face of said valve seat possessing a cylindrical curvature about an axis substantially perpendicular to a longitudinal axis of said valve seat;
 an air exhaust aperture formed through said valve seat;
 said first end portion of said valve body received for relative rotation in close conformance within said hollow body portion of said valve actuator such that an interior substantially cylindrical side wall portion of said valve actuator restrains said valve seat from movement radially outwardly from said air exhaust passage, said outer end face of said valve seat and said interior side wall portion of said valve actuator possessing substantially corresponding cylindrical curvatures such that said valve seat end face forms a substantially airtight seal against said interior side wall portion;
 said valve actuator and said valve body mounted for relative rotation such that said valve seat air exhaust aperture is mounted for selective movement into and out of alignment with said air exhaust passage in said valve actuator;
 an air hose including a first end adapted for connection with a source of compressed air and an opposite end extending through said slot in said valve actuator and disposed in threaded engagement with said air supply bore of said valve body;
 said rib of said valve body disposed in abutment with a circular end face of said valve actuator;
 said second end portion of said valve body possessing a longitudinally extending enlarged diameter substantially cylindrical bore;
 a reduced diameter substantially coaxial longitudinally extending substantially cylindrical conduit formed within said enlarged diameter bore in said second end portion of said valve body and disposed in fluid communication with said air exhaust aperture in said valve seat and said air supply bore;
 a pair of substantially cylindrical coupling balls received for radial movement in substantially diametrically opposite transverse apertures in said second end portions of said valve body;
 a circumferential groove disposed around an outer end portion of said second end portion of said valve body;
 a coupling sleeve disposed for limited reciprocal axial sliding movement around said second end portion of said valve body, said coupling sleeve including a stepped diameter substantially cylindrical hollow interior with a smaller diameter portion dimensioned for close conformance with said second end portion of said valve body and a larger diameter portion dimensioned to allow said coupling balls to move partially radially outwardly from said opposite transverse apertures; and
 a C-ring disposed in engagement with said circumferential groove in said second end portion of said valve body, said C-ring having a diameter greater than said smaller diameter portion of said coupling sleeve such that said coupling sleeve is prevented from displacement from said second end portion of said valve body, whereby said conduit in said valve body may be selectively connected to a quick release valve of a dunnage air bag.

2. An inflation and deflation valve for use with a dunnage air bag, comprising:
 a valve body including an air supply bore for connection to a source of compressed air, an air exhaust passage, and an air conduit including a connector for engagement with a dunnage air bag valve;
 an exhaust valve in said valve body for selectively opening and closing said air exhaust passage; and
 a valve actuator mounted for rotation about said valve body for selectively opening and closing said exhaust valve whereby a dunnage air bag may be selectively inflated or deflated without disconnection from said inflation and deflation valve, said valve actuator including a cirfumferentially extending slot receiving an air supply hose having one end connected to said air supply bore and an opposite end connected to a source of compressed air, and an air exhaust passage adapted for selective alignment with said exhaust valve.

3. The inflation and deflation valve of claim 2, further comprising a muffler connected to said air exhaust passage.

4. The inflation and deflation valve of claim 2, further comprising means for directing an air stream from a compressed air source through said air supply bore and out of said air exhaust passage when said exhaust valve is open for facilitating deflation of a dunnage air bag through induced vacuum aspiration.

5. A method of inflating and deflating a dunnage air bag including an air bag valve, comprising the steps of:
 providing a source of compressed air;

providing an inflation and deflation valve comprising:
  a valve body including an air supply bore for connection to said source of compressed air, an air exhaust passage, and an air conduit including a connector for engagement with said dunnage air bag valve;
  an exhaust valve in said valve body for selectively opening and closing said air exhaust passage;
  a valve actuator for selectively opening and closing said exhaust valve;
connecting said air supply bore to said source of compressed air;
connecting said air conduit connector to said dunnage air bag valve;
selectively operating said valve actuator to inflate or deflate said dunnage air bag without disconnection from said inflation and deflation valve; and
selectively directing an air stream from said compressed air source through said air supply bore and out of said air exhaust passage when said exhaust value is open to facilitate deflation of said dunnage air bag through induced vacuum aspiration.

6. The method of claim 5, further comprising the step of connecting a muffler to said air exhaust passage to reduce noise levels during deflation of said dunnage air bag.

7. A method of inflating and deflating a dunnage air bag including an air bag valve, comprising the steps of:
  providing a source of compressed air;
  providing an inflation and deflation valve means for selectively connecting said air bag valve to said compressed air source in a closed position for inflating said bag and for selectively connecting both said air bag valve and said compressed air source to ambient in an open position for deflating said bag; and
  selectively direction an air stream from said compressed air source through said inflation and deflation valve means in said open position to ambient to facilitate deflation of said dunnage air bag through induced vacuum aspiration.

8. The method of claim 7, further comprising the step of connecting a muffler to said inflation and deflation valve means to reduce noise levels during deflation of said dunnage air bag.

9. An inflation and deflation valve for sue with a dunnage air bag, comprising:
  a valve body including an air supply bore for connection to a source of compressed air, an air exhaust passage, and an air conduit including a connector for engagement with a dunnage air bag valve;
  said air supply bore disposed substantially in alignment with said air exhaust passage and substantially out of alignment with said air conduit;
  an exhaust valve in said valve body for selectively opening and closing said air exhaust passage; and
  a rotatable valve actuator on said valve body for selectively opening and closing said exhaust valve whereby a dunnage air bag may be selectively inflated or deflated without disconnection from said inflation and deflation valve, and such that an air stream from a compressed air source can be directed through said air supply bore and out of said air exhaust passage when said exhaust valve is open for facilitating deflation of a dunnage air bag through induced vacuum aspiration.

10. An inflation and deflation valve for use with a dunnage air bag, comprising:
  a valve body including an air supply bore for connection to a source of compressed air, an air exhaust passage, and an air conduit including a connector for engagement with a dunnage air bag valve;
  an exhaust valve in said valve body for selectively opening and closing said air exhaust passage;
  a valve actuator mounted for rotation about said valve body for selectively opening and closing said exhaust valve whereby a dunnage air bag may be selectively inflated or deflated without disconnection from said inflation and deflation valve; and
  a muffler connected to said air exhaust passage.

11. An inflation and deflation valve for use with a dunnage air bag, comprising:
  a valve body including an air supply bore for connection to a source of compressed air, an air exhaust passage, and an air conduit including a connector for engagement with a dunnage air bag valve;
  an exhaust valve in said valve body for selectively opening and closing said air exhaust passage; and
  a valve actuator mounted for rotation about said valve body for selectively opening and closing said exhaust valve whereby a dunnage air bag may be selectively inflated or deflated without disconnection from said inflation and deflation valve, said valve actuator comprising:
    a circumferentially extending slot in a sidewall portion of said valve actuator; and
    a cylindrical exhaust passage formed through a side wall portion of said valve actuator disposed substantially diametrically opposite a medial portion of said slot.

12. An inflation and deflation valve for use with a dunnage air bag, comprising:
  a valve body including an air supply bore for connection to a source of compressed air, an air exhaust passage, and an air conduit including a connector for engagement with a dunnage air bag valve;
  an exhaust valve in said valve body for selectively opening and closing said air exhaust passage; and
  a valve actuator mounted for rotation about said valve body for selectively opening and closing said exhaust valve whereby a dunnage air bag may be selectively inflated or deflated without disconnection from said inflation and deflation valve;
  said exhaust valve including a spring seat in said valve body surrounding an inner end of said air supply bore;
  a valve seat received for reciprocal sliding movement in said air exhaust passage, said valve seat possessing an inner reduced diameter neck portion forming an annular shoulder;
  a coil compression spring possessing a first end disposed in abutment with said spring seat and a second opposite end surrounding said neck portion and abutting said annular shoulder, said spring biasing said valve seat radially outwardly;
  a radially outer end face of said valve seat possessing a cylindrical curvature about an axis substantially perpendicular to a longitudinal axis of said valve seat;
  an air exhaust aperture formed through said valve seat;
  said valve body received for relative rotation in close conformance within said valve actuator such that an interior substantially cylindrical side wall portion of said valve actuator restrains said valve seat from movement radially outwardly from said air exhaust passage, said outer end face of said valve seat and said interior side wall portion of said valve actuator possessing substantially corresponding cylindrical curvatures such that said valve seat end face forms a substantially airtight seal against said interior side wall portion; and said valve actuator and said valve body mounted for relative rotation such that said valve seat air exhaust aperture is mounted for selective movement into and out of alignment with said air exhaust passage in said valve actuator.

13. An inflation and deflation valve for use with a dunnage air bag, comprising:

a valve body including an air supply bore for connection to a source of compressed air, an air exhaust passage, and an air conduit including a connector for engagement with a dunnage air bag valve;

an exhaust valve in said valve body for selectively opening and closing said air exhaust passage; and a valve actuator mounted for rotation about said valve body for selectively opening and closing said exhaust valve whereby a dunnage air bag may be selectively inflated or deflated without disconnection from said inflation and deflation valve;

said connector comprising:

a pair of substantially cylindrical coupling balls received for radial movement in substantially diametrically opposite transverse apertures in said valve body;

a circumferential groove disposed around an outer end portion of said valve body;

a coupling sleeve disposed for limited reciprocal axial sliding movement around said outer end portion of said valve body, said coupling sleeve including a stepped diameter substantially cylindrical hollow interior with a smaller diameter portion dimensioned for close conformance with said outer end portion of said valve body and a larger diameter portion dimensioned to allow said coupling balls to move partially radially outwardly from said opposite transverse apertures; and a C-ring disposed in engagement with said circumferential groove in said outer end portion of said valve body, said C-ring having a diameter greater than said smaller diameter portion of said coupling sleeve such that said coupling sleeve is prevented from displacement from said outer end portion of said valve body, whereby said conduit in said valve body may be selectively connected to a quick release valve of a dunnage air bag.

14. An inflation and deflation valve for use with a dunnage air bag, comprising:

a valve body including an air supply bore for connection to a source of compressed air, an air exhaust passage, and an air conduit including a connector for engagement with a dunnage air bag valve;

an exhaust valve in said valve body for selectively opening and closing said air exhaust passage; and a valve actuator mounted for rotation about said valve body for selectively opening and closing said exhaust valve whereby a dunnage air bag may be selectively inflated or deflated without disconnection from said inflation and deflation valve; and means for directing an air stream from a compressed air source through said air supply bore and out of said air exhaust passage when said exhaust valve is open for facilitating deflation of a dunnage air bag through induced vacuum aspiration.

* * * * *

UNITED STATES PATENT AND TRADEMARK OFFICE
CERTIFICATE OF CORRECTION

PATENT NO. : 5,437,301

DATED : August 1, 1995

INVENTOR(S) : J.W. Ramsey

It is certified that error appears in the above-identified patent and that said Letters Patent is hereby corrected as shown below:

In Claim 5, at column 7, line 22 of the Patent, change the word "value" to -- valve --.

In Claim 7, at column 7, line 38 of the Patent, change the word "direction" to -- directing --.

Signed and Sealed this

Twenty-seventh Day of February, 1996

Attest:

BRUCE LEHMAN

*Attesting Officer*   *Commissioner of Patents and Trademarks*